United States Patent Office 3,006,835
Patented Oct. 31, 1961

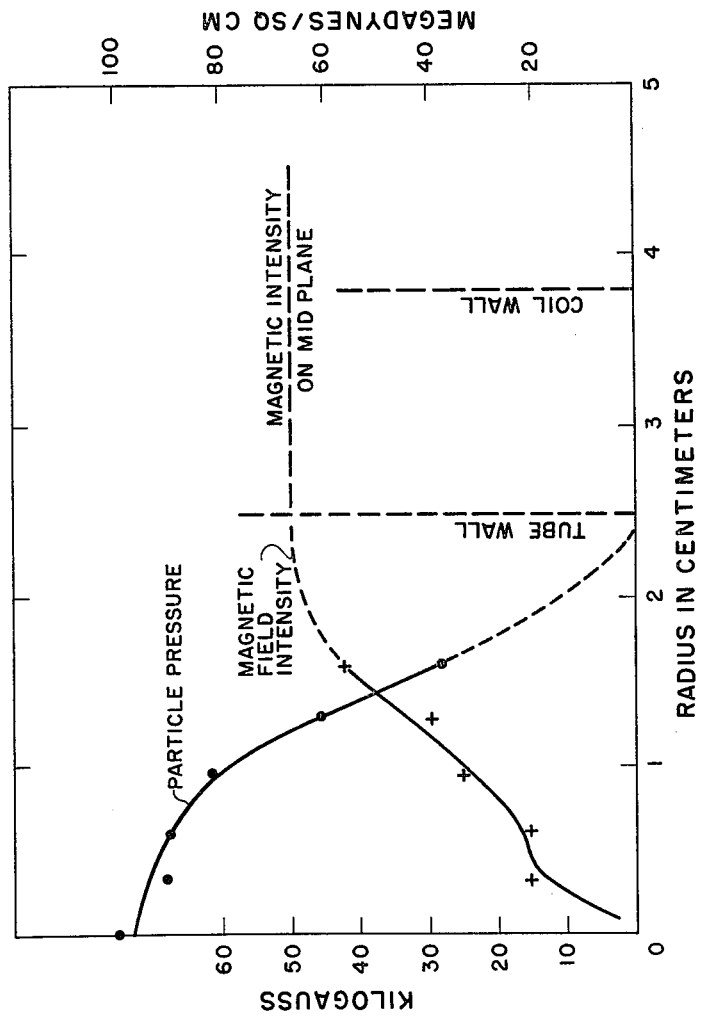

3,006,835
NEUTRON SOURCE USING MAGNETIC
COMPRESSION OF PLASMA
Warren E. Quinn, Los Alamos, N. Mex., William C.
Elmore, Swarthmore, Pa., and Edward M. Little, Keith
Boyer, and James L. Tuck, Los Alamos, N. Mex., assignors to the United States of America as represented
by the United States Atomic Energy Commission
Filed Feb. 25, 1959, Ser. No. 795,570
5 Claims. (Cl. 204—193.2)

The present invention relates to methods and means for obtaining neutrons of possible thermonuclear origin, and more particularly to such methods and means utilizing a magnetic compression of an ionized thermo-nuclear fuel. Such methods and means are not only useful as potential sources of net power, but are useful in themselves as neutron sources for such purposes as geological scanning devices, means for starting fission reactors, etc.

In many of the devices proposed as thermonuclear reactors, the primary mechanism relied on for compressing and heating the gaseous fuel is the pinch effect. The primary difficulty with such devices is the inherent instability of the pinch. This instability causes the pinched fuel to expand and cool before there has been sufficient time for an adequate number of thermonuclear reactions, and much effort has been devoted to techniques for increasing the stability of the pinch. Such techniques make for increased complexity of the devices proposed by the addition of more structural elements and more associated electrical power supplies and control equipment.

In the present invention a different approach is adopted, one that avoids reliance on the pinch effect and its associated instability problems. The present invention relies principally on the fact that an ionized gas or plasma can be quickly compressed and heated by a rapidly rising magnetic field generated by currents in an external coil, in contrast to the self-generation of a magnetic field by currents in the plasma itself (the pinch effect).

It is therefore an object of the present invention to provide methods and means for compressing and heating a thermonuclear fuel by a rapidly rising externally applied magnetic field.

A further object is to provide such methods and means whereby said fuel is compressed and heated to a temperature sufficient to promote thermonuclear reactions.

Another and further object is to provide methods and means for obtaining neutrons by the magnetic compression of an ionized thermonuclear fuel.

Another object is to provide methods and means for ionizing, heating and compressing a thermonuclear fuel by a rapidly rising magnetic field.

The above and further objects are accomplished in the present invention by the general technique of passing a rapidly rising current through an electrical conductor or coil surrounding a chamber in which a thermonuclear fuel is confined. (See FIGURE 1.) Assuming a cylindrical gas confining chamber, such current 2 is passed circumferentially about the chamber. The resulting induced electric field 4 existing just inside the coil at the beginning of the pulse ionizes the gas in its vicinity and causes a circumferential current 5 therein. This current sheath 5 is repelled by the rising current 2 in the coil and sets up a strong shock wave which proceeds to the center of the gas, ionizing and heating it. As the current in the conducting shell increases, a rapidly increasing axial magnetic field 3 is manifested. This field compresses the plasma as it increases and causes a considerable amount of irreversible joule heating and reversible heating by adiabatic compression.

In the present invention the current pulse is obtained by discharging a high-voltage capacitor bank into the conducting coil through low resistance leads having a minimum inductance. In general, the system is designed to achieve the greatest possible magnetic field intensity in the shortest possible time. The design must, of course, take into account the required dimensions of the containing vessel, which dimensions are normally chosen by other considerations. Thus, for conditions otherwise the same, a one-inch bore gives a greater peak intensity than a two-inch bore, but inferior yields result because more wall impurities get into the plasma in the vessel of the one-inch bore.

The complete circuit of the power supply, connecting leads and coil thus constitutes a tank circuit, wherein there is an oscillating sinusoidal current damped exponentially by the inevitable small resistive components of the circuit elements, including the equivalent resistance of the plasma. The variation of applied voltage 1 and coil current 2 are shown in FIG. 1. With such low resistance in the circuit, voltage and current are essentially 90 degrees out of phase and the frequency of oscillation is essentially $$\frac{1}{2\pi\sqrt{LC}}$$

During the first half cycle of operation, a certain amount of irreversible heat energy is imparted to the plasma, as indicated above. Maximum compression and maximum plasma temperature are obtained at the peak of the current oscillations, coinciding with maximum magnetic field intensity. At such current peaks the electric field 4 in the plasma passes through zero and there is thus no accelerating force available to the plasma particles.

As the first half-cycle of the current wave nears completion and the magnetic field intensity 3 consequently approaches zero, the magnetic compressive force on the plasma is relaxed and the plasma expands to the confining wall. At such time, however, the voltage on the coil nears its maximum in the opposite direction and the resulting reversed electric field in the plasma thereafter initiates a reverse current in the plasma. Again the plasma is repelled by the coil current and the magnetic field intensity increases rapidly in the opposite longitudinal direction.

At the end of the first half cycle, the gaseous fuel is left in an ionized state and with a certain amount of thermal energy. While this energy may not be sufficient to achieve thermonuclear temperatures and fusion reactions in the first half cycle, such reactions are obtained in the second and succeeding half cycles because the thermal energy accumulates from one half cycle to the next. Neutrons are obtained at peak magnetic field intensity, when the compression is a maximum. After a few oscillations from one discharge, fusion reaction stops because compression is reduced and wall impurities introduced by the pulsating plasma absorb too large a share of the available kinetic energy.

The present invention can be best understood by referring to the accompanying drawings, hereby incorporated herein by reference, in which:

FIGURE 2a is a cross section on lines 2a—2a of FIGURE 2;

Figure 1:
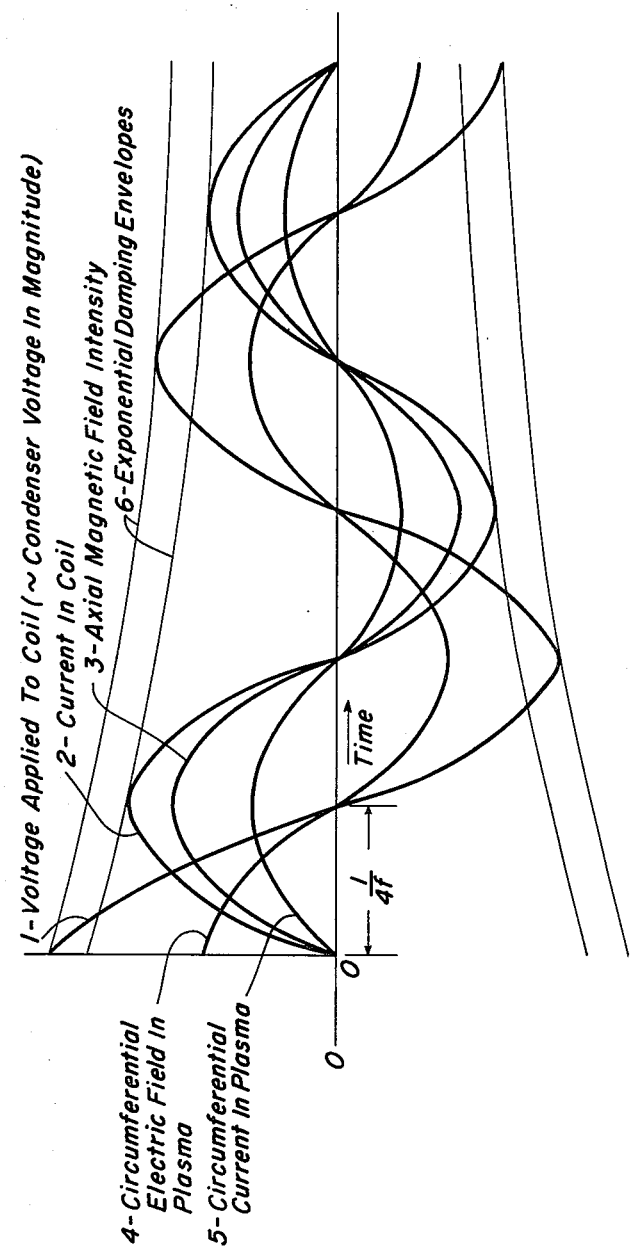
FIGURE 1 is a generalized graphical representation of the voltage, current and magnetic field intensity relationships of the present invention.
Figure 2:
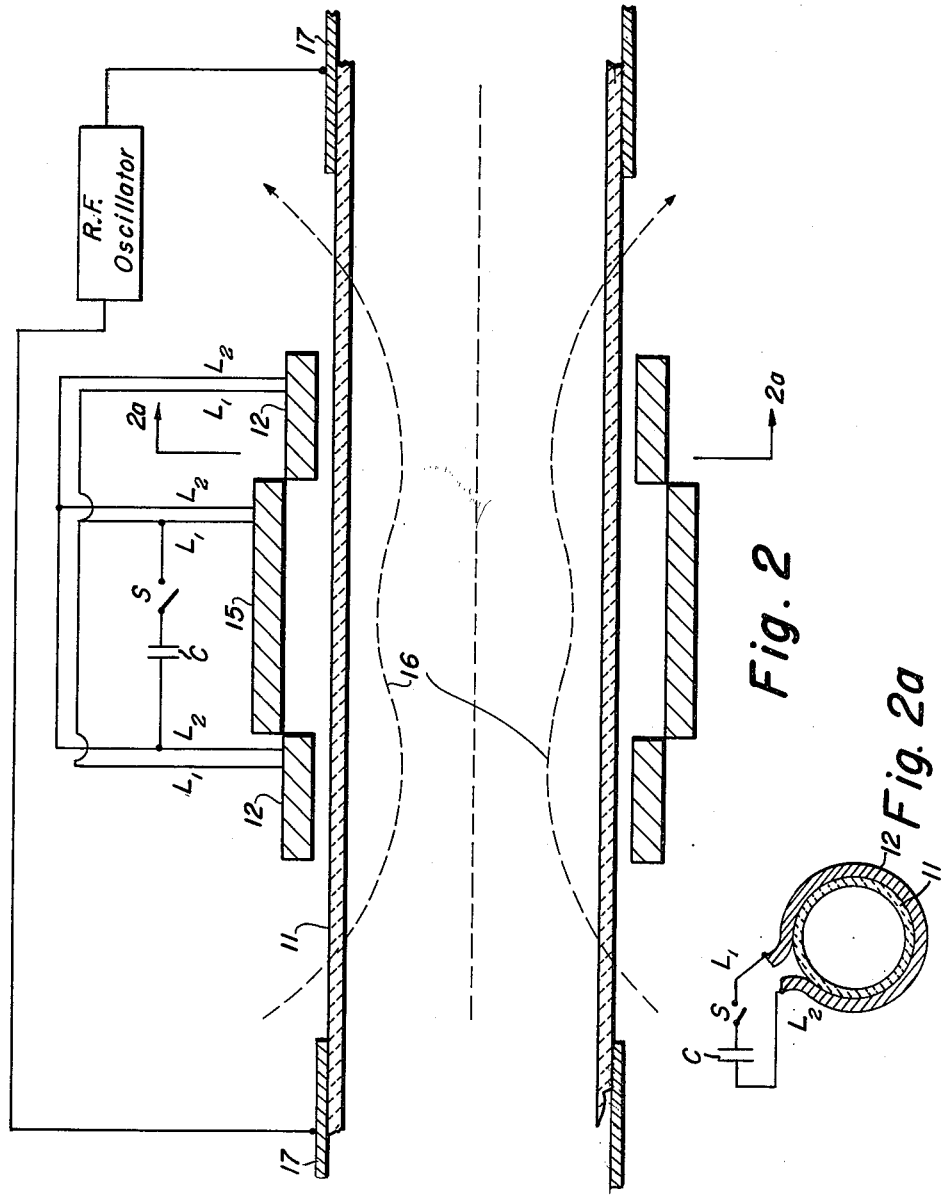
FIGURE 2 is a longitudinal section of a straight tube embodiment of the present invention, utilizing converging magnetic fields or mirrors and multiple coils, the external circuitry being indicated schematically.

Referring now to FIGURES 2 and 2a, it may be seen that this embodiment of the present invention includes a generally cylindrical gas-confining ceramic container 11 surrounded by one or more circumferential end coils 12 and center coil 15. All three coils are operated in parallel to reduce their inductance, as by parallel leads $L_1$ connected to one end of each coil 12 and coil 15 and parallel leads $L_2$ connected to the other ends in such manner that all three instantaneous current paths are either clockwise or counterclockwise through the coils. Leads $L_1$ are connected to one side of the capacitor bank C through spark gaps indicated schematically as a switch S, while leads $L_2$ are connected to the other side of capacitor bank C.

The three coils of FIGURE 2 may, of course, be fabricated as a single integral coil. Such single coils have been built and used successfully with the straight ceramic tubes of FIGURE 2 by simply making a single coil in which the outside circumference is uniform but the central portion proceeding axially is of larger inside diameter than the end portions. Since the magnetic lines penetrate the ceramic container 11 freely but do not penetrate the conducting material of the coil in the short times involved, the only condition necessary to achieve a magnetic mirror is to have a larger cross-sectional opening in the center portion of the coil than in the end portions.

Ceramic container 11 is preferably made of low Z-number materials such as alumina and silica to avoid introducing high Z-number impurities into the plasma and thereby increasing Brehmsstrahlung losses. Also important is the tendency of the container walls to adsorb impurities which have the same deleterious effect. A container consisting largely of fused alumina is one of the best materials in this respect. A tube consisting of about 60 weight percent (w/o) fused alumina, balance essentially silica, was used to obtain the results indicated in FIGURE 4. Substitution of a tube containing 96 w/o alumina increased the yield by a factor of 10.

The fuel gas is admitted at one end and flows out the other end of the container 11. In the FIGURE 2 embodiment the coils are positioned and the voltage is applied to create a magnetic field having a greater intensity at each end than in the center, as indicated by the field lines 16 of FIGURE 2. Each end area of converging magnetic flux thus serves as a magnetic "mirror," which reflects those ionized particles having helical orbits along field lines outside the loss solid angle $$1-\left(1-\frac{1}{R}\right)^{1/2}$$

where R, the mirror ratio, is the ratio of the field intensity at the mirror to that in the region of confinement. The basic equations underlying mirror reflections are fully developed by Richard F. Post in the Review of Modern Physics 28, 338 (1956), at pp. 353–355.

It is to be noted that the mirror reflection referred to above is considerably augmented by the diamagnetic effect of the circumferential plasma current. This current creates a magnetic field opposing that of the coil current in accordance with Lenz's law, just as in a transformer. The result is a lower net magnetic field intensity in the central region and a greater mirror ratio than that calculated for a vacuum by taking the ratio of field intensities at mirror and center or its virtual equivalent, the ratio of the cross-sectional areas inside the coil at these points.

Using the three single-turn coil arrangement shown in FIGURE 2, the circuit parameters and dimensions in a particular embodiment are as follows:

| | |
|---|---|
| Capacitance of 100 kv. rated capacitor bank _____ μf__ | 8.8 |
| Source and line inductance _____ μh__ | 0.038 |
| Coil inductance (parallel) _____ μh__ | 0.034 |
| I.D. of ceramic tube _____ cm__ | 5 |
| Overall length of coils _____ cm__ | 10 |
| Tank frequency _____ c.p.s__ | $0.2 \times 10^6$ |
| Average mirror ratio (vacuum) _____ | 1.4 |

With a capacitor voltage 1 of 70 kv. (kilovolts) and no gas present, the initial peak electric field 4 just inside the tube wall, at the middle of each end coil 12, is 1.6 kv./cm. A quarter period later (1.25 μsec.) this field has decreased to zero and the central axial magnetic field 3 has reached its peak value of 59 kilogauss.

Although neutrons (and X-rays) are produced under the conditions outlined when deuterium at pressures of 5–1000 microns is added, it is preferable to pre-ionize the gas by radio pre-excitation. This is accomplished by conventional electronic oscillator apparatus having an output of about 600 watts at 27.2 megacycles, the latter being fixed by law and being relatively unimportant so long as it is many times the frequency of the tank circuit. The oscillating voltage of such apparatus, having a peak of about one kilovolt, is applied to a pair of copper bands 17 about one inch wide by 20 mils thick surrounding the gas-confining ceramic tube 11 (see FIG. 2) at a distance of about 6 inches from the central plane. The resulting high frequency electric field within the tube ionizes the gas. While this field is still present, the capacitor bank is discharged into the main coils as outlined above, after which the RF oscillator may be switched off. The average duration of this applied excitation is about 15 seconds, but as little as one second will suffice. It may be left on continuously during operation without affecting the yield. There appears to be nothing critical about the electrode spacing; only a slight increase in yield is noticed when the electrodes are moved up to the mirror areas. Similarly, there is no inherent necessity for disposing electrodes 17 outside rather than inside the ceramic tube 11. They may be disposed within the tube with equally good results, or other shapes of internal electrodes may be substituted with similarly good results. Such choice is largely a matter of convenience, the external band electrodes of FIGURE 2 being preferred because they avoid the need for passing leads through the wall of tube 11.

The use of RF pre-excitation greatly increases the neutron yield and suppresses X-ray emission, especially at lower gas pressures. Apparently this result follows from a delay in complete ionization of the gas during the time the magnetic field is rapidly increasing in intensity, so that a significant fraction of the final compression field exists at the time the ions are formed. This field reduces the ultimate plasma compression and, in addition, causes ion trajectories of somewhat higher escape probability.

In building an operating model, it is preferable to avoid leakage flux, i.e., field lines extending less than the full distance within the container 11 between mirrors, as these lines permit plasma leakage to the walls and introduce wall contamination. It is possible to use a uniform bore gas container 11 by providing end coils of smaller diameter than one or more central coils 15, as in FIGURE 2, but it is also possible to use a gas container 25 generally conforming to the shape of the magnetic field, as in FIGURE 3. Therein the structure consists of a single turn of heavy copper, fabricated as lower half 21 and upper half 22 for assembly purposes, having a maximum diameter at the median plane and tapering to a smaller diameter at each end. With this type structure leakage flux is virtually eliminated in the short periods involved. In this embodiment are also shown the flat plate low inductance leads 23 and the insulation sheets 24 mounted between leads 23 and between each coil half 21 and 22 and the gas container 25. The coil is assembled from the two halves 21 and 22 with machine screws 26. Ordinary clamping means, not shown, may be used to hold the assembly consisting of the terminal flange 27 of coil half 22, leads 23, insulating sheets 24 and terminal flange 28 of coil half 21 in sufficient compression to insure good electrical contact between leads 23 and the coil flanges 27 and 28.

Figure 3:
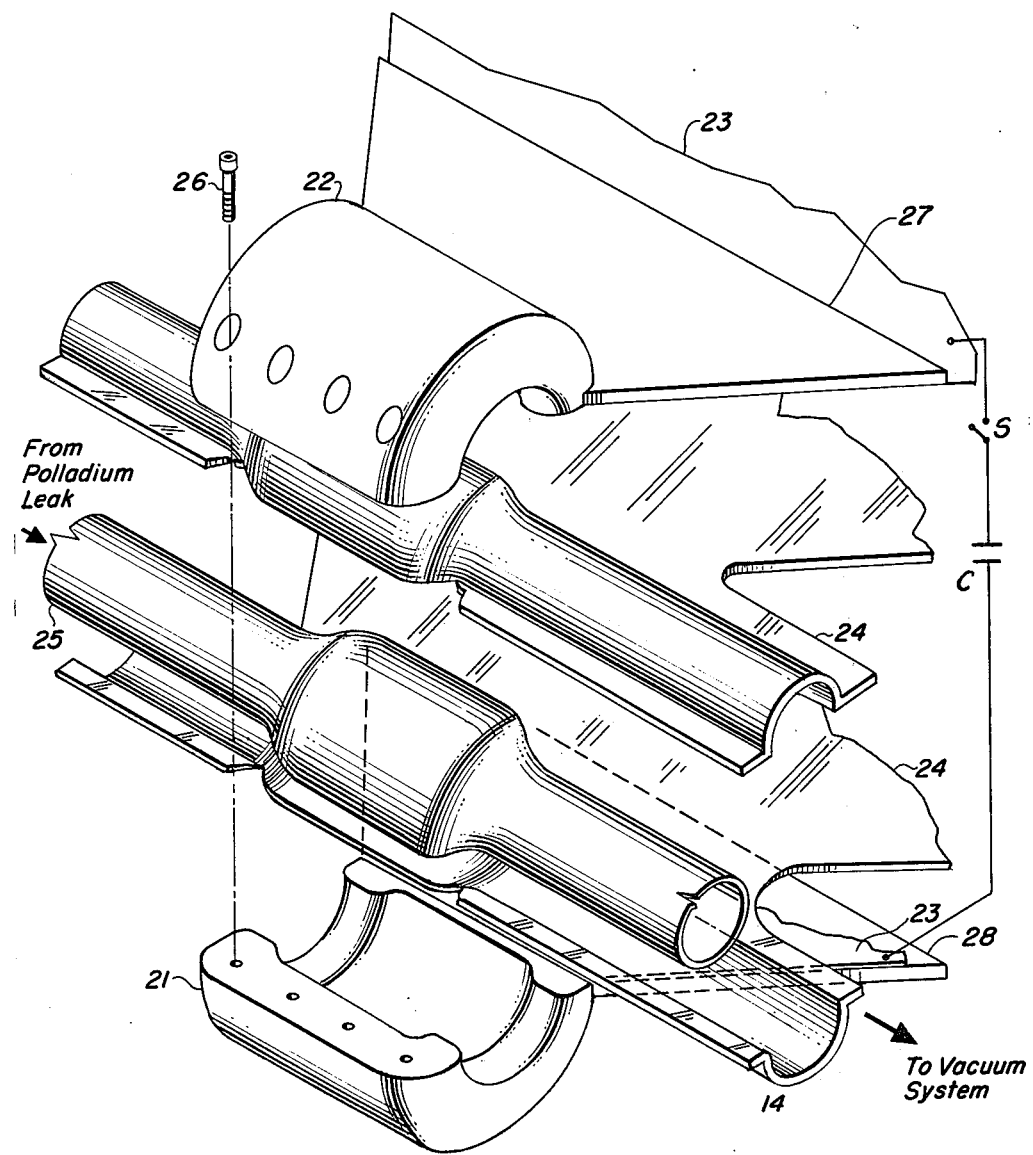
FIGURE 3 is a perspective exploded view of an embodiment similar to that of FIG. 2, modified by the use of a single coil and a tube converging at both ends.

The preferred embodiment of FIGURE 3 is not essentially different from that shown in FIGURE 2. The multiple turns of FIGURE 2 have been consolidated in FIGURE 3 to form a single turn. The use of a gas container tube 25 in FIGURE 3 having a wide opening at the center and narrow end openings, together with the conforming shape of the closely fitting single-turn coil 21 and 22 (see FIGURE 3) makes it possible to obtain higher mirror ratios. Since all field lines within the coil cavity pass completely through from one end to the other, the magnetic field intensity is essentially controlled by the area of the opening at any axial position. This embodiment thus permits a more efficient utilization of the magnetic field produced by the coil 21—22. There is also less tendency to introduce wall impurities than is the case with a uniform diameter gas containing tube, as the former reduces the space between the gas tube and the surrounding conductor to a minimum at all points.

Figure 4:
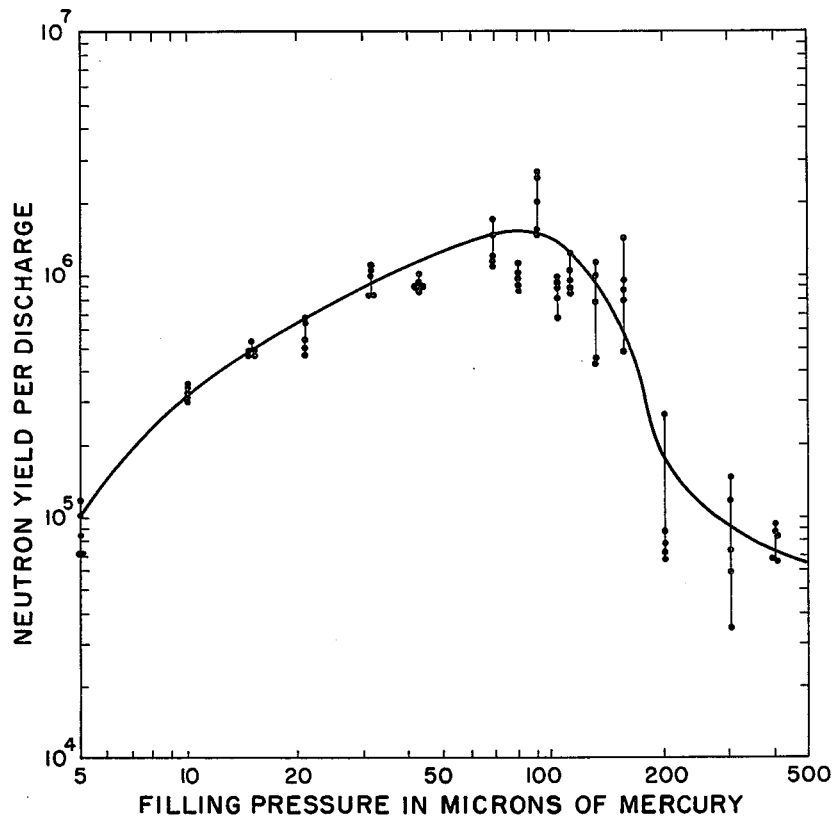
FIGURE 4 is a graph showing the neutron yield of the embodiment of FIG. 2 as a function of filling pressure.

Some results obtained with the three-turn embodiment of FIGURE 2 at various deuterium filling pressures are depicted in FIGURE 4. These neutron yields were obtained with the source condenser bank charged to 70 kv. and with the RF pre-excitation described above. Neutron yields were measured with a silver counter calibrated with D—D neutrons from a Cockroft-Walton accelerator.

With respect to time, the neutron bursts last about 1 μsec. and are symmetrically centered at the instant of peak compression (maximum I and H), when the induced electric field in the plasma passes through zero. No neutron emission occurred during the first half cycle, but did occur during the second half cycle and to a much lesser extent in the third half cycle. X-rays, on the other hand, are observed at the beginnings and ends of compressive cycles, when the electric field is at or near maximum. The X-rays escaping the apparatus are energetic X-rays, 200 Kev. or more, and occur only at relatively low deuterium filling pressures—below 50 microns. These X-rays appear to rise from runaway electrons scattered out of mirror confinement and into the tube walls in the exterior regions of diverging flux, as indicated by dark bands left on the tube walls, about 13 cm. from the midplane of the tube.

Figure 5:
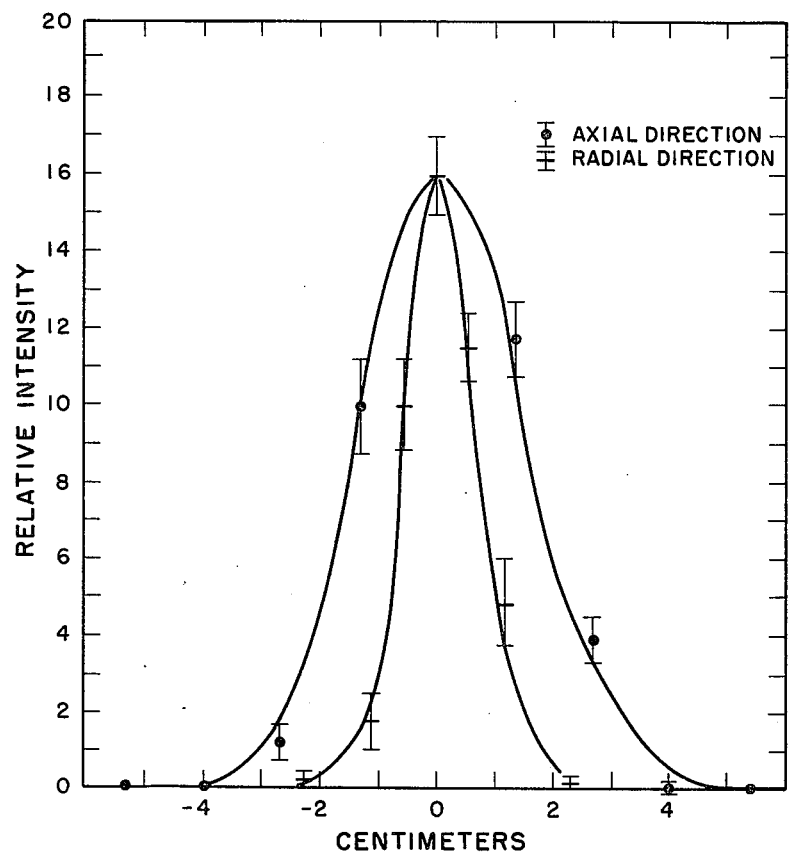
FIGURE 5 is a graph showing relative neutron yield at various distances from the geometrical center of the FIG. 2 embodiment.
Figure 6:
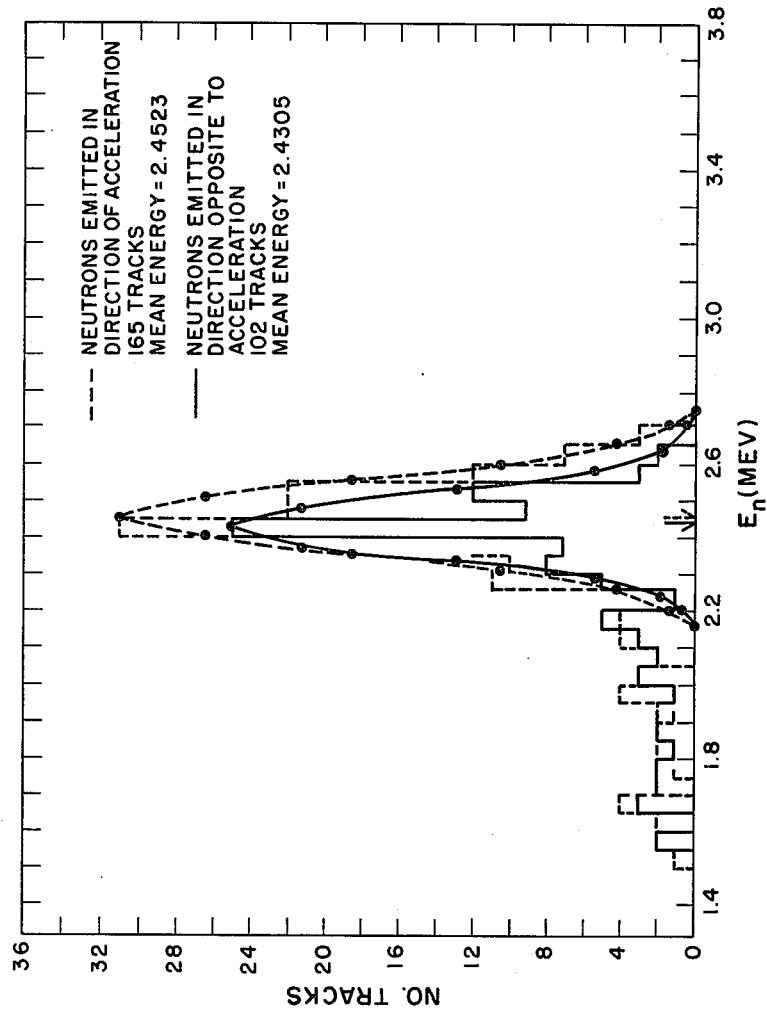
FIGURE 6 is a graph showing the neutron energy spectrum of the same embodiment for directions coinciding and opposed to the direction of the electric field in the plasma, and FIGURE 7 contains graphs of particle pressure and magnetic field intensity as a function of the radius of the same embodiment.

The graphs of FIGURES 5, 6 and 7 are the results of a number of diagnostic experiments with the embodiment of FIGURE 2, modified by increasing the O.D. of the end coils 12 to that of the center coil 15 and using the parameters and dimensions heretofore listed for such embodiment, with the capacitor bank charged to 70 kv. and with a filling of deuterium gas at 100 microns. FIGURE 5 shows the shape and position of the neutron emitting portion of the plasma as determined by neutron detecting apparatus utilizing a paraffin collimator loaded with lithium to stop scattered neutrons and lead shielding to stop X-rays. Using a plastic scintillator and a fourteen stage photomultiplier coupled to a cathode ray oscilloscope, this apparatus records neutrons passing through a 1 cm. diameter aperture in the collimator and was used to scan the entire volume inside the tube 11 during operation as described. As indicated in FIGURE 5, the bulk of these neutrons originate in a cylindrical portion of the plasma-containing tube 11 and concentric therewith, such portion being about 1.5 cm. in diameter by 3 cm. long. FIGURE 5 also shows clearly that all neutrons originate in the gas, away from the walls of tube 11 and inside its 5 cm. I.D. and the 10 cm. coil length.

Under the same operating conditions as were used to obtain the results indicated in FIGURE 5, a thick paraffin plate was mounted with its upper surface parallel to and 0.33 cm. above a plane passing through the longitudinal axis of the FIGURE 2 embodiment, modified as above. Nuclear emulsions were mounted on this plate at a distance of 15 cm. from such axis and the device was operated many times for each of the possible magnetic field orientations, i.e., with each possible polarity of voltage applied to coils 12 and 15.

The results of this experiment are summarized in FIGURE 6 of the drawing for D—D reactions under the conditions described above. As there indicated, the average energy of neutrons emitted in the direction of the accelerating field is 2.4523 million electron volts (mev.), while the average energy of neutrons emitted in the direction opposed to such field is 2.4305 mev. The difference in these two values of 0.0218 mev., or 21.8 Kev., represents an average shift of 10.9 Kev. from the neutron's share of the mass defect of the reaction. Translated into the deuteron frame, this means that the corresponding average deuterium ion energy is 150±60 electron volts. Magnetic probe measurements indicate a deuteron rotational energy of possibly 40 ev. as a result of $\vec{E} \times \vec{B}$ drift. At such deuteron energies, the fusion cross section is considerably less than $10^{-29}$ cm.$^2$ and the corresponding rate of reaction, which equals the rate of neutron formation, is about $10^5$ per microsecond at the particle density of $6 \times 10^{16}$ deuterons/cc. achieved, a figure which accounts for only about 10 percent of the $10^6$ neutrons/microsecond observed and recorded in FIGURE 4.

The results of a further experiment with the modified embodiment of FIGURE 2 operated under the same conditions are illustrated in FIGURE 7. The graph of magnetic field intensity versus radius was obtained with a magnetic probe and the graph of particle pressure was deduced from pressure balance considerations. These graphs illustrate the diamagnetic effect referred to above and show confinement of the plasma in the center of the device.

In considering the various results obtained in the operation of the FIGURE 2 embodiment, the probability that the neutrons observed are thermonuclear in origin, i.e., that they result from D—D reactions occurring solely from random collisions between deuterium ions thermalized at their impact energies rather than being randomly accelerated to such energies or higher, can be seen from the following considerations:

(1) If the neutrons are produced by accelerating one deuterium ion into another, there is no obvious reason for the appearance of neutrons only during time intervals centered on peak compression, when the electric field passes through zero. Similarly, there is no accounting for the lack of neutrons at the beginning of the first half cycle, when the electric field has its maximum value, unattenuated by damping. On the other hand, the conditions at peak compression all point to the occurrence of thermonuclear reactions. Irreversible thermal energy has been imparted to the plasma, reversible adiabatic energy reaches a maximum, and the ion density also peaks. The fact that neutrons are not observed until the second half cycle, when the accumulative heat energy is higher, also indicates thermonuclear reactions;

(2) The fact that X-rays occur only near instants of minimum compression and maximum electric field indicates that the only important acceleration reactions occur at such instants. Because of their much smaller masses, the electrons which give rise to X-rays are more easily accelerated at such times. The very fact that no neutrons are observed with the X-rays seems to indicate that the acceleration process plays no important part in positive ion reactions;

(3) The decreasing X-ray yield and increasing neutron yield with initial filling pressures, up to 100 microns, also indicates that the neutrons are of thermonuclear origin. Since the mean free path for both electrons and ions decreases with increasing density, it is to be expected that at a high density neither type particle can be accelerated to a very high velocity before colliding with other particles. Thus the X-rays observed at lower pressures are suppressed because the plasma electrons do not acquire sufficient energy to escape the mirror confinement. On the other hand, if the neutrons observed are the result of accelerating one deuterium ion into another (or into a tritium particle, or vice versa), there would be at least as great an increase in X-ray yield in going from the lower to the higher filling pressure, again due to the much smaller mass of the electron;

(4) To determine the effect of impurities in the fuel, 1 volume percent and 5 volume percent of dry air were added to 100 microns of deuterium. With yields such as those indicated in FIGURE 4 for the pure gas, the neutron yields of the impure gas were reduced to approximately 50 percent and 3 percent, respectively, for the additions of 1 micron and 5 microns of air. At the same time there was no decrease in the X-ray yield.

These results indicate that the neutrons observed must be thermonuclear by the following line of reasoning. The oxygen and nitrogen impurities are of higher Z number than either the deuterium or tritium in the fuel. Radiation loss by Brehmsstrahlung, which increases as $Z^2$ increases, is greater than in the pure fuel under conditions otherwise the same. More energy is radiated and the plasma temperature is lower than with the pure fuel. Consequently, the number of reactions brought about by random collisions of thermalized ions, which varies exponentially with temperature, will fall off sharply.

On the other hand, the electric field in the plasma is not affected by the presence of impurities and hence any acceleration process will not be affected. Thus the fact that the X-ray yield obtained from runaway electrons is not reduced while the neutron yield is considerably reduced when impurities are added indicates that the neutrons are of thermonuclear origin;

(5) The nuclear emulsion studies summarized in FIGURE 7 indicate that the circumferential electric field in the plasma plays at most a minor part in the fusion reactions producing the observed neutrons. The small shift in deuteron energy is inconsistent with the neutron yields obtained, as deuterons randomly accelerated in direction to energies between 2.5 and 6 Kev. incident on deuterons at rest would be necessary to account for such yields by pure acceleration. The data is all consistent with a plasma of deuterons thermalized to a Maxwellian distribution of a kinetic temperature of 1.3 Kev. and a maximum compression of $6 \times 10^{16}$ particles per cc. at peak compression.

In summary, the described experiments indicate that the only reasonable explanation of the yields obtained is that thermonuclear reactions and temperatures have been obtained, although such temperatures are below those necessary to obtain a greater release of energy than that required to operate the embodiment used in the experiments.

What is claimed is:

1. A neutron source comprising in combination an insulating tube of low Z-number materials and of generally cylindrical shape, a filling of a thermonuclear fuel in said tube at low pressure, said fuel consisting of at least 50 atomic percent deuterium and the balance tritium, single turn coil means of very low resistance and very low inductance coaxially surrounding at least a portion of said tube, said coil means terminating in circumferentially adjacent ends and external circuit means connected to said coil ends for obtaining a damped rapidly oscillating electrical current in said coil means, said coil means and said tube being shaped and disposed to confine within said portion of said tube the portion of said gas ionized by the use of said external circuit means, and ionizing means consisting essentially of band electrodes surrounding said tube at opposite ends of said portion surrounded by said coil and a source of RF voltage connected across said electrodes.

2. The neutron source of claim 1 in which said single turn coil means consists of two or more single turn coils connected in parallel to each other.

3. The neutron source of claim 1 in which said thermonuclear filling has an initial pressure of 5–1000 microns, said external source consists essentially of a capacitor bank, switching means and leads of very low inductance and resistance, the capacitance of said capacitor and the inductance of said leads and said coil being such as to provide a tank frequency of the order of $10^4$–$10^6$ cycles per second.

4. The neutron source of claim 3 in which said tube is linear in the longitudinal dimension and substantially uniform in cross section, and said at least one coil is disposed to provide a magnetic field having a minimum strength at the center of said portion of said tube and increasing to a maximum at the ends of said portion.

5. The neutron source of claim 3 in which said tube is linear in the longitudinal dimension, said at least one coil has a maximum opening at its central cross sections and tapers to a smaller opening at each end, and said tube has a shape conforming to the shape of said coil opening.

References Cited in the file of this patent

UNITED STATES PATENTS

| 2,939,048 | Waniek | May 31, 1960 |
| 2,939,049 | Blackman | May 31, 1960 |
| 2,940,011 | Kolb | June 7, 1960 |

OTHER REFERENCES

NYO–7899 The Proposed Model C Stellerator. August 29, 1957. The U.S. Atomic Energy Commission. Technical Information Service. Oak Ridge, Tennessee. Pages 15–32, 385–388.

Proceedings of the Second United Nations International Conference on the Peaceful Uses of Atomic Energy, vol. 32, United Nations, Geneva. 1958, pages 72–91, 337–342.

Project Sherwood by Amasa S. Bishop, Addison-Wesley Publ. Co., September 1958, pages 70, 71, 146, 147.